United States Patent
Choo et al.

(10) Patent No.: US 7,656,568 B2
(45) Date of Patent: Feb. 2, 2010

(54) OPTICAL SWITCH USING FREQUENCY-BASED ADDRESSING IN A MICROELECTROMECHANICAL SYSTEMS ARRAY

(75) Inventors: Hyuck Choo, Albany, CA (US); Richard S. Muller, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 449 days.

(21) Appl. No.: 11/436,231

(22) Filed: May 17, 2006

(65) Prior Publication Data

US 2006/0262379 A1    Nov. 23, 2006

Related U.S. Application Data

(60) Provisional application No. 60/682,770, filed on May 18, 2005.

(51) Int. Cl.
*G02B 26/08* (2006.01)
*G02B 26/02* (2006.01)
*G02B 6/12* (2006.01)

(52) U.S. Cl. ............... 359/199; 359/225; 359/230; 359/231; 359/233; 359/234; 359/290; 385/14; 385/16; 385/19; 385/22; 385/23; 385/24; 385/25; 385/39; 398/45; 398/50; 398/56

(58) Field of Classification Search ............... 359/197, 359/199, 225, 230, 231, 233, 234, 290, 320; 385/14, 16, 19, 22, 23, 24, 25, 39; 398/45, 398/50, 56

See application file for complete search history.

(56) References Cited

U.S. PATENT DOCUMENTS

2003/0068118 A1 *   4/2003   Bourgeois et al. ............ 385/19

OTHER PUBLICATIONS

H. Choo, and R. S. Muller, "Addressable Microlens Array to Improve Dynamic Range of Shack-Hartmann Sensors," Solid-State Sensor and Actuator Workshop, Jun. 6-10, 2004, pp. 1-4.

R. Ramaswami and K. N. Sivarajan, "Optical Networks—A Practical Perspective," Chap. 3, San Francisco: Academic Press, Morgan Kaufmann Publishers, 1998, USA.

* cited by examiner

*Primary Examiner*—Evelyn A. Lester
(74) *Attorney, Agent, or Firm*—Charles J. Kulas; Trellis IP Law Group, PC

(57) ABSTRACT

Embodiments of the present invention provide structures for microelectromechanical systems (MEMS) that can be sensed, activated, controlled or otherwise addressed or made to respond by the application of forcing functions. In particular, an optical shutter structure suitable for use in an optical switch arrangement is disclosed. In one embodiment, an optical shutter or switch can be scaled and/or arranged to form arbitrary switch, multiplexer and/or demultiplexer configurations. In another embodiment of the present invention, an optical switch can include: a shutter; and a flexure coupled to the shutter, whereupon a vibration transmitted to the flexure when in the presence of a resonant frequency causes the shutter to move across an opening for the passage of an optical signal.

17 Claims, 12 Drawing Sheets

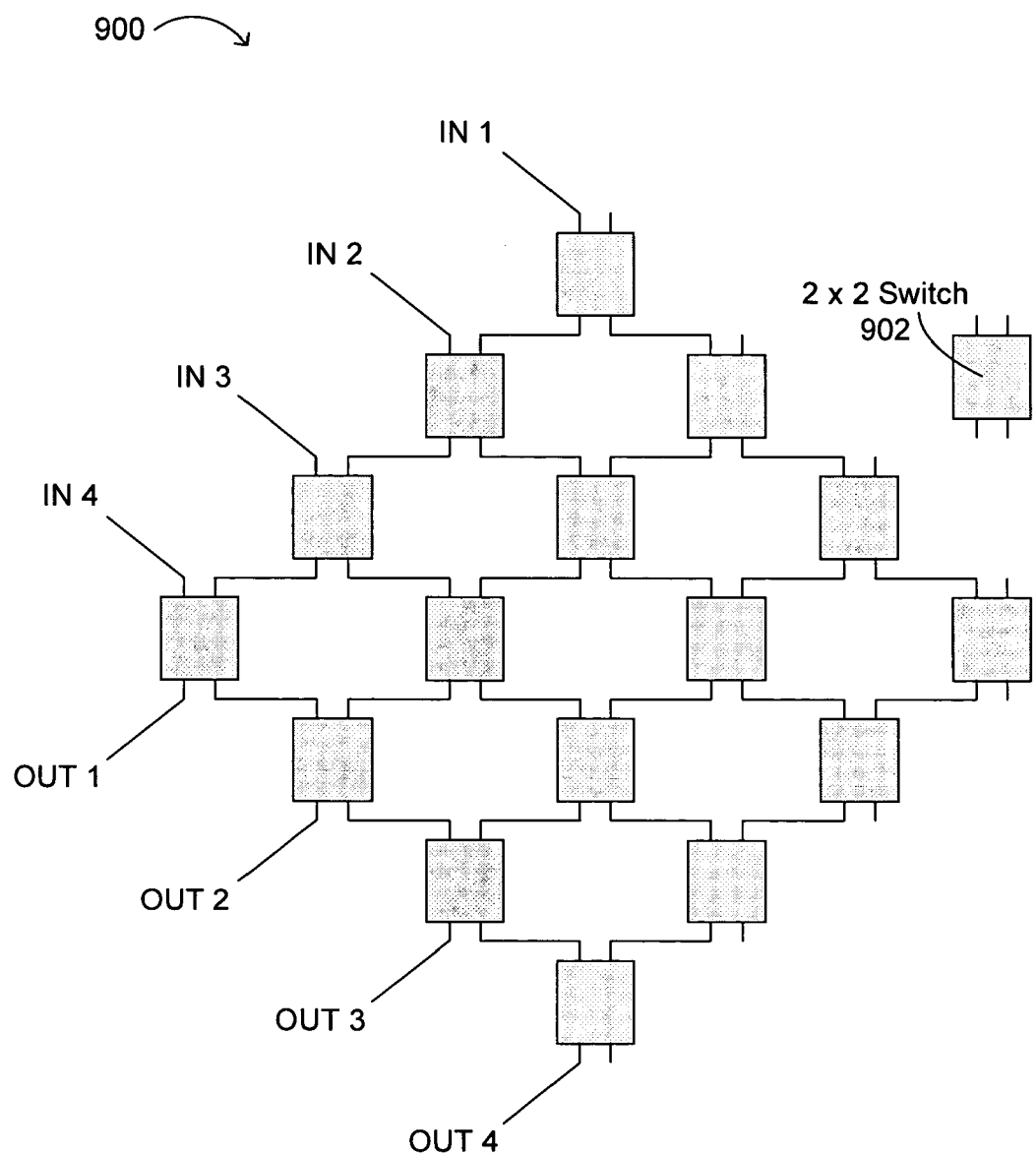
Figure 9 (conventional)

OPTICAL SWITCH USING FREQUENCY-BASED ADDRESSING IN A MICROELECTROMECHANICAL SYSTEMS ARRAY

REFERENCE TO RELATED APPLICATIONS

This application claims priority from Provisional U.S. Patent Application 60/682,770 "FREQUENCY-BASED ADDRESSING OF COMPONENTS IN A MICRO-ELECTROMECHANICAL SYSTEMS ARRAY", filed May 18, 2005 and U.S. Pat. No. 7,355,793 entitled "OPTICAL SYSTEM APPLICATION TO IMPROVING THE DYNAMIC RANGE OF SHACK-HARTMANN SENSORS" issued Apr. 8, 2008. These applications are incorporated herein by reference for all purposes.

BACKGROUND OF THE INVENTION

This invention is related in general to microelectromechanical systems (MEMS) and, more specifically, to optical switch implementations using frequency-based addressing and/or control of MEMS components.

Micromechanical structures incorporated into MEMS have advantages over larger designs that accomplish the same or similar functionality because of their smaller size, potentially lower cost of manufacturing, lower power requirements, and better, sometimes unique performance characteristics. A sampling of micromechanical devices that have been built using MEMS-fabrication techniques includes accelerometers, gyroscopes, temperature sensors, chemical sensors, AFM (atomic force microscope) probes, micro-lenses, shutter-actuators, etc. Such devices can be integrated with microelectronics, packaging, optics, and/or other devices or components to realize complete systems. Some examples of MEMS include units that perform inertial measurement, head-mounted displays, wireless gyro-mice, and large display systems.

Some MEMS applications employ arrays of components, such as micromirrors used in digital mirror displays. In array-based MEMS applications, a component design is repeated multiple times (e.g., in one or more rows or columns) to populate an area of the microsystem (e.g., a silicon chip). Typically, each of these distributed components is sensed or controlled individually so that a selected component or selected subset of the total number of components can be used or "addressed" at one time.

One problem with addressing components in a MEMS array using electronic selection is the number of interconnections, multiplexing provisions, and control or other structures that may be needed for successful operation. Building this selection capability into array-based MEMS increases their size, failure susceptibility, complexity of design and manufacture, and cost.

Another problem is that the electronic needs for the selection process are best met with relatively sophisticated integrated circuit (IC) processing, while any mechanical elements in the process often demand equally sophisticated mechanical-device processing. Successfully carrying both processes through on an array (i.e., "mixed-mode processing") is a difficult design challenge. Further, switch implementations using MEMS devices have been found to be particularly susceptible to the problems enumerated above.

SUMMARY OF EMBODIMENTS OF THE INVENTION

Embodiments of the invention provide mechanical structures that can be sensed, activated, controlled or otherwise addressed or moved by the application of frequency-based forcing functions. In this way, selection of elements in the array can be based substantially upon the individual responses of mechanical devices, and may not be based primarily on responses of electrical devices, which can eliminate the need for mixed-mode electrical and mechanical processing in the area of the arrayed mechanical devices.

In accordance with embodiments of the present invention, a grouping of individual structures can be constructed such that each of the structures, or equally a select number of them, has/have unique and different mechanically resonant frequency from that of any other structure or select number of structures in the group. An oscillating forcing function (which may be imposed by electrostatic means, piezoelectric means, magnetic means, or any other suitable means) that is applied to all structures in the group will only have appreciable effect on whichever structure or structures have resonant frequency or frequencies that is or are close to or the same as the oscillation frequency of the applied forcing function.

In one embodiment, an optical shutter or switch can be scaled and/or arranged to form arbitrary switch, multiplexer and/or demultiplexer configurations.

In another embodiment of the present invention, an optical switch can include: a shutter; and a flexure coupled to the shutter, whereupon a vibration transmitted to the flexure when in the presence of a resonant frequency causes the shutter to move across an opening to allow passage of an optical signal.

BRIEF DESCRIPTION OF THE DRAWINGS

FIG. 9 is a conventional 4×4 optical switch realization using sixteen 2×2 switches.

DETAILED DESCRIPTION OF EMBODIMENTS OF THE INVENTION

In accordance with embodiments of the present invention, an optical shutter or switch can be scaled and/or arranged to form arbitrary switch, multiplexer and/or demultiplexer configurations. For example, an optical switch can include: a shutter; and a flexure coupled to the shutter, whereupon a vibration transmitted to the flexure when in the presence of a resonant frequency causes the shutter to move across an opening for the passage of an optical signal.

In accordance with embodiments of the present invention, frequency-based addressing and/or control can be used for MEMS components or elements. In one particular example, a forcing frequency can be applied to a shutter component. Further, an array of such shutter components can be arranged to implement various optical switches, as will be discussed in more detail below.

Figure 1:
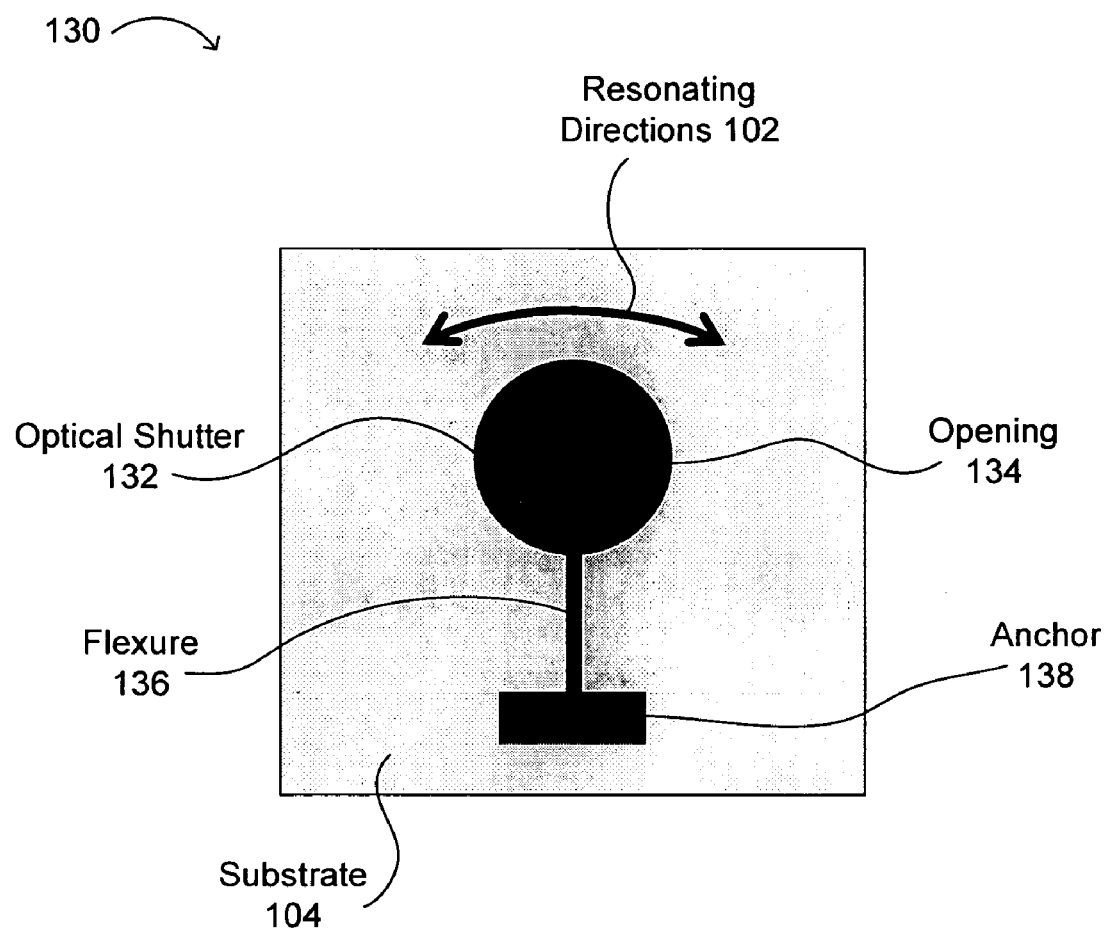
FIG. 1 is an exemplary mechanically resonating optical shutter in accordance with embodiments of the present invention.

Referring now to FIG. 1, an exemplary mechanically resonating optical shutter in accordance with embodiments of the present invention is shown and indicated by the general reference character 130. Optical switch component 130 can include optical shutter 132, which can cover opening 134. Opening 134 may not be visible when optical shutter 132 is in the "closed" position, as shown in FIG. 1. Flexure 136 can be coupled between optical shutter 132 and anchor 138. Anchor 138 can be mounted to substrate or base 104 so that anchor 138 is in a fixed position relative to opening 134.

Further, optical shutter 132 can resonate in the presence of resonating frequency, $f_n$. Resonating directions 102 can indicate a positional response of optical shutter 132 when resonating frequency $f_n$ is applied. Such an optical shutter can be used as a component in forming optical switches of any arrangement, as well as multiplexer and/or demultiplexer configurations. Further, among the materials suitable for manufacture of such an optical shutter are silicon (Si), polycrystalline silicon (poly-Si), silicon germanium (SiGe), or silicon carbide (SiC), as well as titanium, plastics, or other appropriate materials.

In accordance with embodiments of the present invention, physical properties of components of each resonant unit (e.g., optical shutter 132, flexure 136, and/or anchor 138) can contribute to the specific resonant frequency of structure 130. For example, mass, stiffness, geometry, mechanical relationship, etc., are properties of components that can act independently, or in concert with other components, to determine the resonant frequency. In one embodiment, the geometry of the flexure, along with flexure mass and stiffness, as well as the mass of the optical shutter, can be among characteristics that determine the resonant frequency.

In general, any inertial property of a structure can be set or predetermined and used to select, identify or otherwise affect the structure, particularly with respect to the structure's harmonic resonance response. In some embodiments, it may be useful to vary an inertial property of a structure. In one particular example, the resonant frequency ($f_n$) may be calculated by using the following equation (Eq. 1), where M is the total mass of the resonant unit and k is the total flexure stiffness:

$$f_n = \frac{1}{2 \cdot \pi} \sqrt{\frac{k}{M}} \quad \text{(Eq. 1)}$$

In order to apply such a resonant frequency to the particular components, actuators may be used in various embodiments of the invention, and may include: a voltage source and at least two conductors electrically coupled thereto, where the resonant components are positioned between the conductors and where the voltage has a frequency corresponding to the selected frequency; a current source and at least one conductor electrically coupled thereto, where the resonant components have a primary axis positioned orthogonal to the conductor and where the current has a frequency corresponding to the selected frequency; a vibrator mechanically coupled to the set of resonant components and having a vibration frequency corresponding to the selected frequency; or an electro-thermal heat source thermally coupled to the set of resonant components and having a frequency corresponding to the selected frequency. Each resonant unit may include a material that is selected from at least one of a piezoelectric material, a ferromagnetic material, a shape memory alloy, a pair of electro-thermal bimorph materials, or a thermo-pneumatic material, for example.

Figure 2:
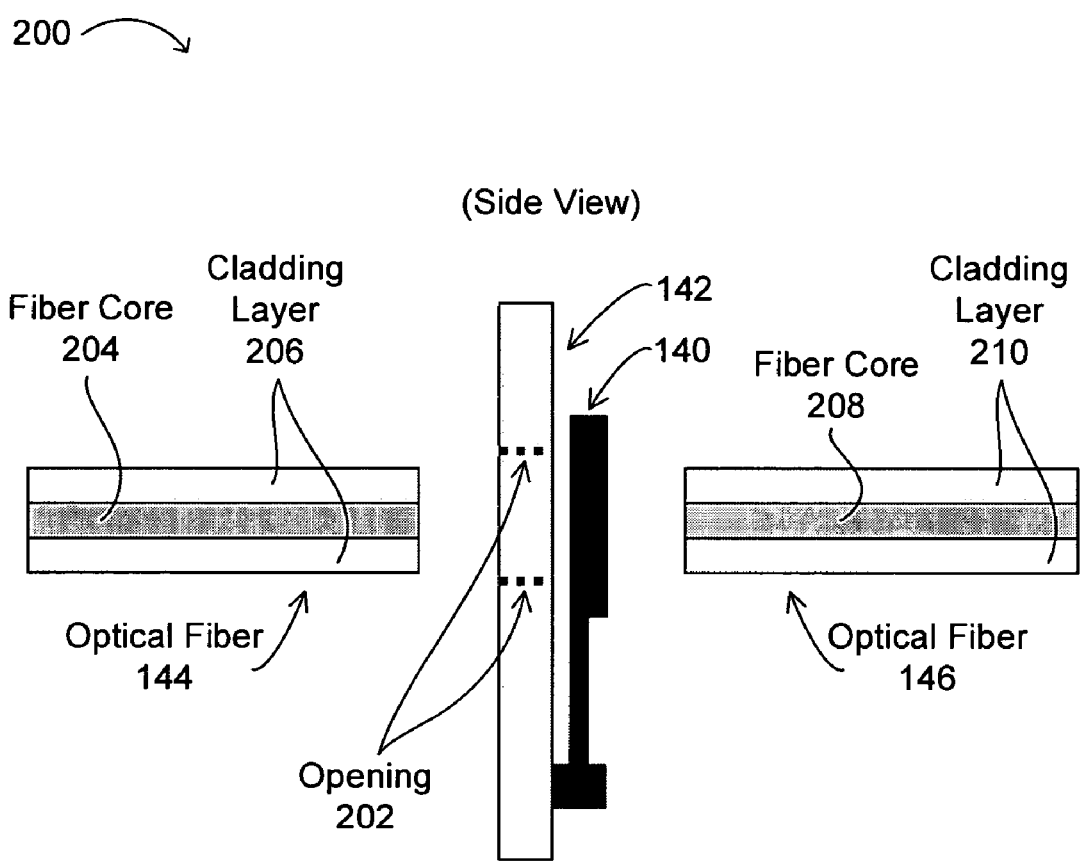
FIG. 2 is an exemplary optical switch in accordance with embodiments of the present invention.

Referring now to FIG. 2, an exemplary optical switch in accordance with embodiments of the present invention is shown and indicated by the general reference character 200. FIG. 2 shows a side view of the optical switch component of FIG. 1, as well as optical fibers 144 and 146 for forming an optical path. In FIG. 2, optical shutter 140 may be mounted at its anchor (e.g., anchor 138 of FIG. 1) to substrate or base 142. Substrate 142 may contain opening 202 through which light can pass when resonating frequency $f_n$ is applied, thereby causing optical shutter 140 to enter an "open" state.

In addition, optical fibers 144 and 146 can be positioned on either side of the assembly of optical shutter 140 and substrate 142. Optical fiber 144 can include fiber core 204 and cladding layer 206. Similarly, optical fiber 146 can include fiber core 208, as well as cladding layer 210. Light can pass through fiber cores 204 and 208. In operation, when optical shutter 140 is in a closed position (e.g., no application of its resonating frequency $f_n$), transmission of light between optical fibers 144 and 146 via opening 202 in substrate 142 can be blocked. However, when optical shutter 140 is in an open position in response to applied resonant frequency $f_n$, transmission of light between optical fibers 144 and 146 via opening 202 in substrate or base 142 can be allowed.

Figure 3:
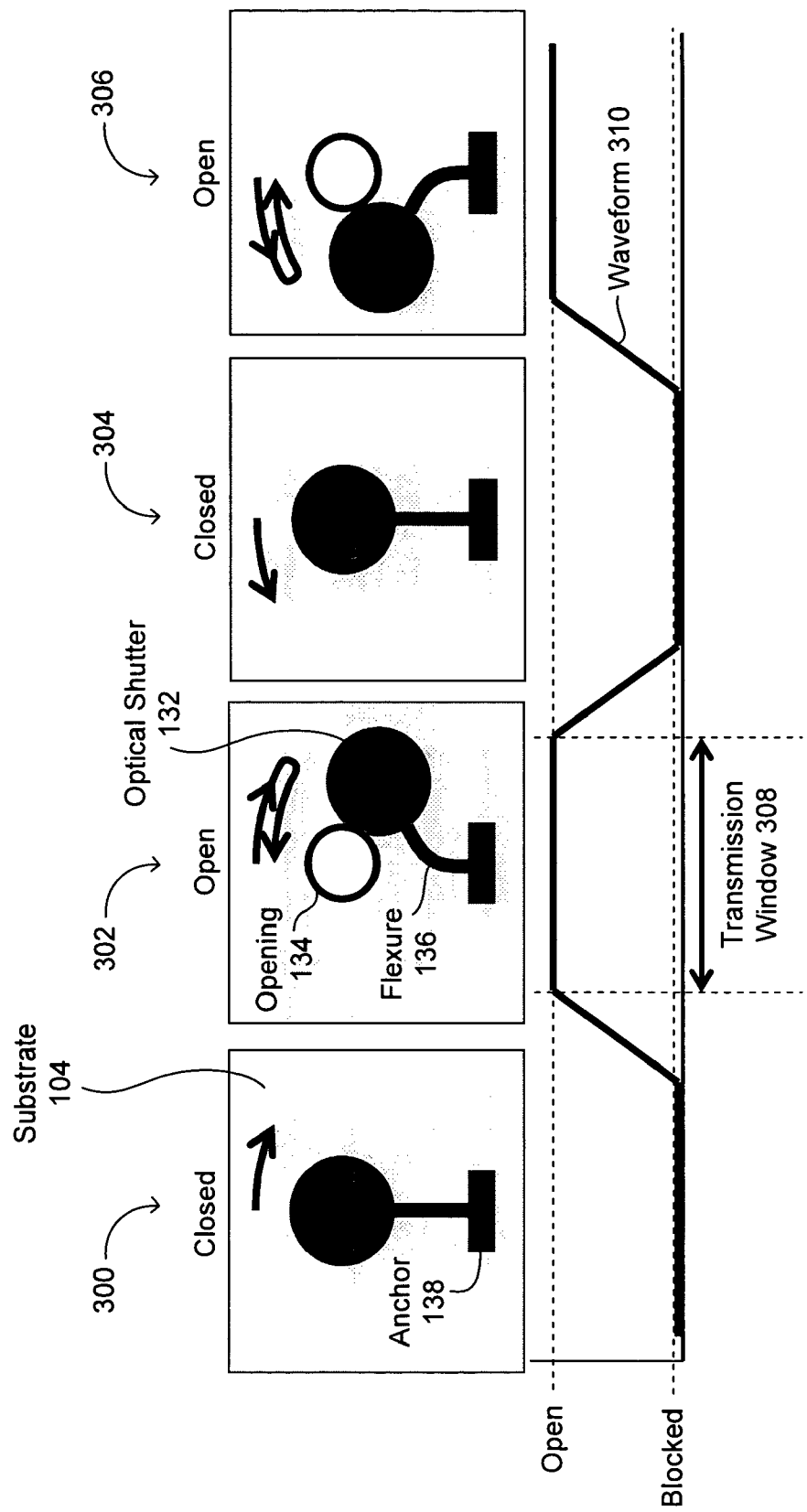
FIG. 3 is an exemplary optical switch operation and associated timing diagram in accordance with embodiments of the present invention.

Referring now to FIG. 3, an exemplary optical switch operation and associated timing diagram in accordance with embodiments of the present invention is shown. FIG. 3 shows how vibration of anchor 138 (e.g., coupled to substrate 104) can cause bending of flexure 136 so that optical shutter 132 can move enough to permit light to pass from one optical fiber to another via opening 134.

Optical shutter 132 in a closed position is indicated by general reference character 300. As shown in waveform 310, a closed position can correspond to a blocked transmission of light between associated optical fibers (e.g., optical fibers 144 and 146 of FIG. 2). Optical shutter 132 in an open position is indicated by general reference character 302. As shown in waveform 310, an open position can correspond to an open or allowed transmission of light between associated optical fibers (e.g., optical fibers 144 and 146 of FIG. 2). This is also indicated by transmission window 308. Such a transmission window can modulate the light transfer from blocked, or zero transmission, through partial opening, to full opening, for example.

Such a pattern can repeat in accordance with addressing or control via applied frequencies, for example. Thus, whenever no resonant frequency $f_n$ is present, optical shutter 132 can be in a closed position (e.g., 300 and 304), corresponding to a blocked transmission of light between associated optical fibers. However, when resonant frequency $f_n$ is present, optical shutter 132 can be in an open position (e.g., 302 and 306), corresponding to an open or allowed transmission of light between associated optical fibers.

Figure 4:
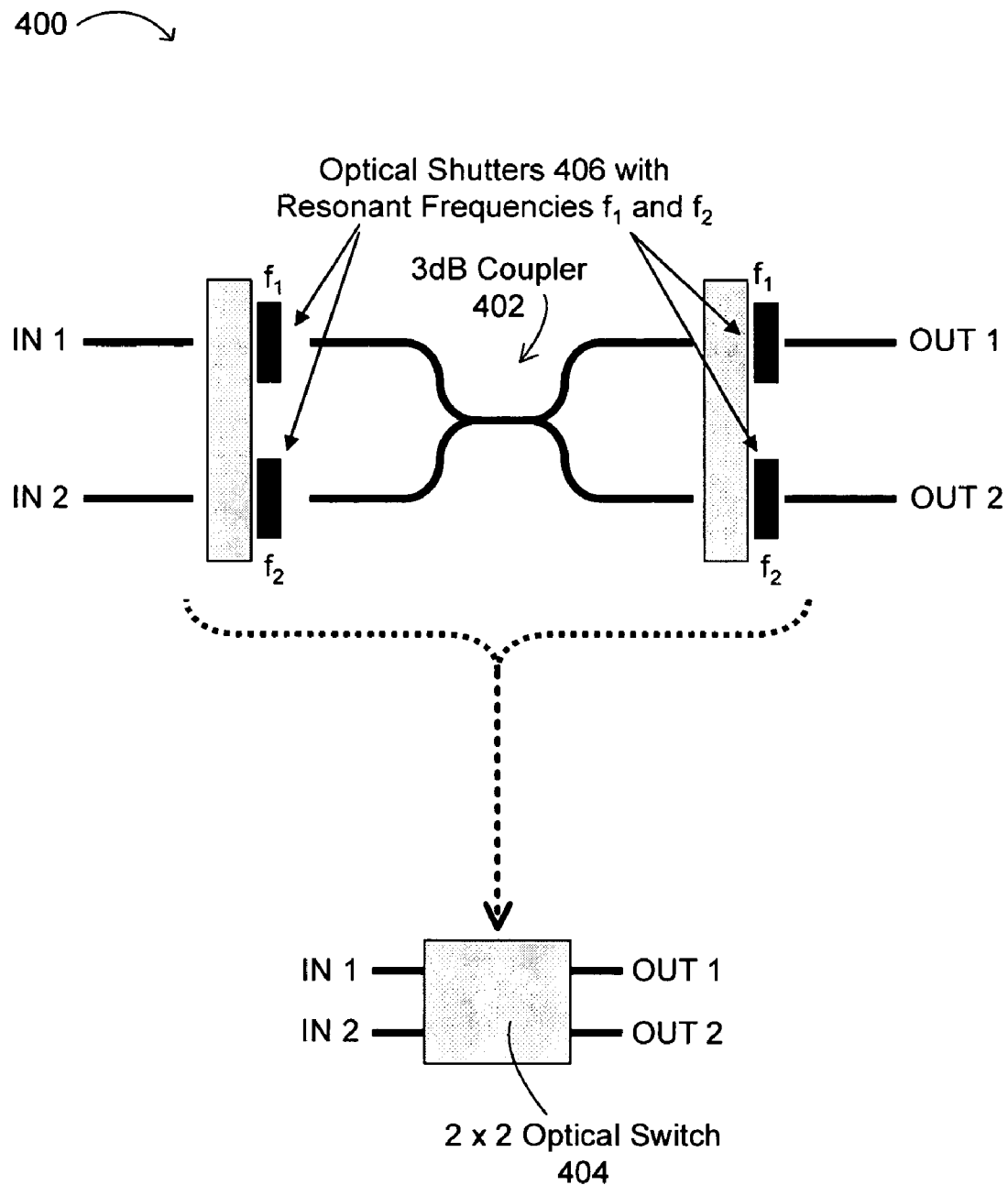
FIG. 4 is an exemplary 2×2 optical switch in accordance with embodiments of the present invention.

Referring now to FIG. 4, an exemplary 2×2 optical switch in accordance with embodiments of the present invention is shown and indicated by the general reference character 400. In the particular example of FIG. 4, an arrangement of four optical shutters (406) with a 3 dB coupler (402) can achieve a 2×2 optical switch (404). By designing the components (e.g., each optical shutter) to have different (or the same) resonant frequencies and by applying different frequencies to the components, different of the shutters can be made to open or close to achieve switching of optical signals.

In FIG. 4, IN 1 can be coupled to one of optical shutters 406 having a resonant frequency $f_1$. IN 2 can be coupled to another one of optical shutters 406 with resonant frequency $f_2$. Similarly, OUT 1 can be coupled an optical shutter 406 having a resonant frequency $f_1$ and OUT 2 can be coupled to an optical shutter 406 with resonant frequency $f_2$. One or more of IN 1, IN 2, OUT 1, and/or OUT 2 may be optical fibers suitable for carrying an optical signal, for example.

Figure 5:
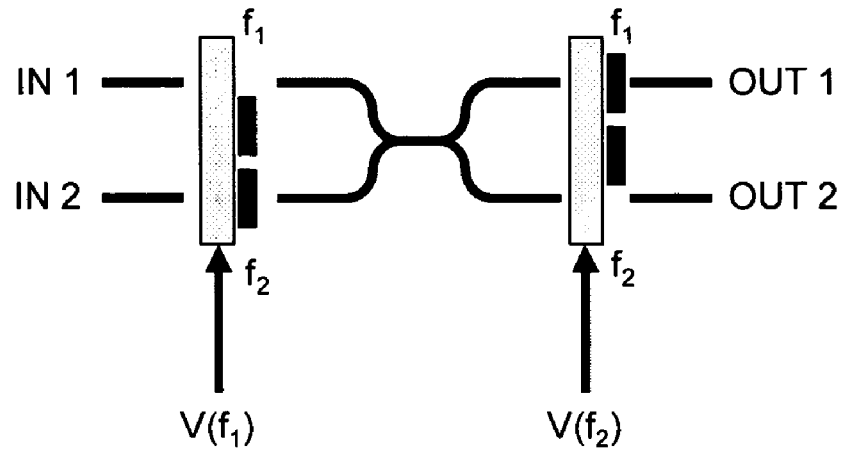
FIG. 5 shows exemplary 2×2 optical switch variations in accordance with embodiments of the present invention.
Figure 5:
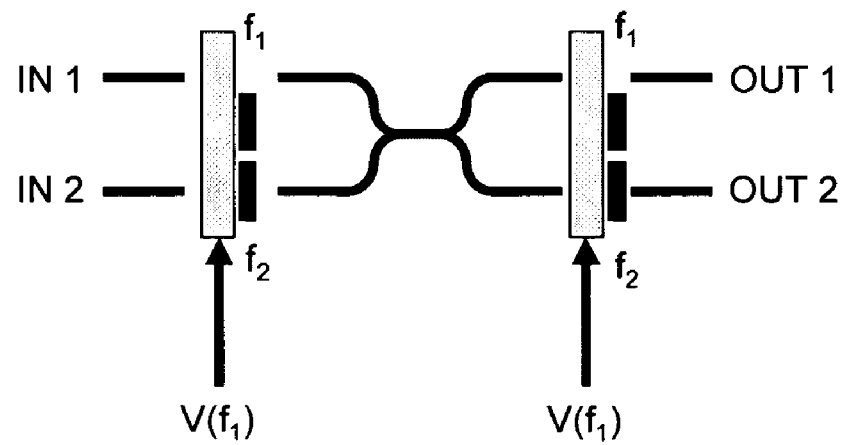

Referring now to FIG. 5, exemplary 2×2 optical switch variations in accordance with embodiments of the present invention are shown and indicated by the general reference characters 500 and 502. In 2×2 optical switch variation 500, $V(f_1)$ can be applied to an optical shutter having a resonant frequency $f_1$ and coupled to IN 1, as well as an optical shutter having a resonant frequency $f_2$ and coupled to IN 2. $V(f_2)$ can be applied to an optical shutter having a resonant frequency $f_1$ and coupled to OUT 1, as well as an optical shutter having a resonant frequency $f_2$ and coupled to OUT 2, for example.

A voltage $V(f_n)$ (e.g., $V(f_1)$ or $V(f_2)$ discussed above) can be used to apply frequency $f_n$ to particular optical shutter components. Such an applied voltage $V(f_n)$ can be a train of pulses at frequency $f_n$ or a square or triangular wave with frequency $f_n$, for example. In one particular example, applied voltage $V(f_1)$ may be sinusoidal in nature and may be related to the frequency ($f_n$) in accordance with the following equation (Eq. 2):

$$V(f_n) = V \sin(2\pi f_n t) \quad \text{(Eq. 2)}$$

As shown in 2×2 optical switch variation 500, application of $V(f_1)$ to the input side and application of $V(f_2)$ to the output side allows a path from IN 1→OUT 2. This is because IN 1 is coupled to an optical shutter responsive to $V(f_1)$ (i.e., has a resonant frequency of $f_1$) and OUT 2 is coupled to an optical shutter responsive to $V(f_2)$ (i.e., has a resonant frequency of $f_2$). In contrast, because IN 2 and OUT 1 are coupled to optical shutters that have resonant frequencies of $f_2$ and $f_1$, respectively, these shutters remain in the closed position and light from associated optical fibers may be blocked as a result.

Similarly, as shown in 2×2 optical switch variation 502, application of $V(f_1)$ to both the input and the output side of the switch allows a path from IN 1→OUT 1. This is because IN 1 and OUT 1 are coupled to optical shutters responsive to $V(f_1)$ (i.e., has a resonant frequency of $f_1$), while IN 2 and OUT 2 are coupled to optical shutters responsive instead to $V(f_2)$.

Figure 6:
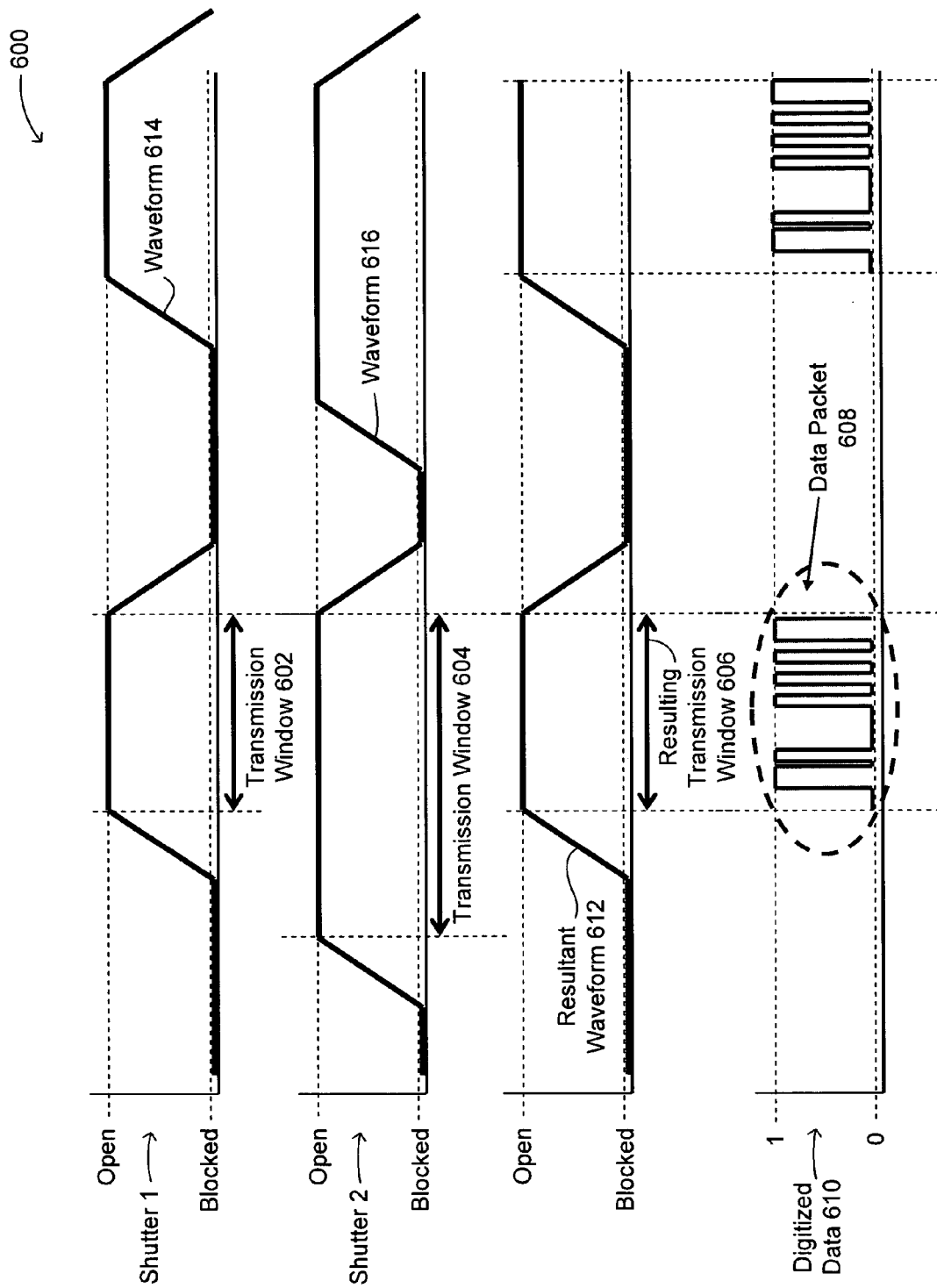
FIG. 6 shows exemplary timing diagrams for data transmission through optical shutters in accordance with embodiments of the present invention.

Referring now to FIG. 6, exemplary timing diagrams showing data transmission through optical shutters in accordance with embodiments of the present invention are indicated by the general reference character 600. In this particular example, timing diagrams are shown whereby a pair of shutters (e.g., shutters 1 and 2) can be used to allow transmission of an optical signal, such as digitized data.

Waveform 614 shows an exemplary timing diagram for shutter 1. A transmission window (e.g., 602) can be established when shutter 1 is in an open state. Similarly, waveform 616 shows an exemplary timing diagram for shutter 2 and a transmission window (e.g., 604) can be established when shutter 2 is in an open state. Resultant waveform 612 can essentially be a logical-AND function of waveforms 614 and 616, for example.

When resultant waveform 612 is in an open state, a transmission window (e.g., resulting transmission window 606) can be established. During such a transmission window, digitized data 610, such as data packet 608, can be communicated. In this fashion, a data packet can thus be communicated from one associated optical fiber to another associated optical fiber, depending on the optical switch settings resulting from applied resonant frequencies using frequency-addressable shutters, as discussed above.

Figure 7:
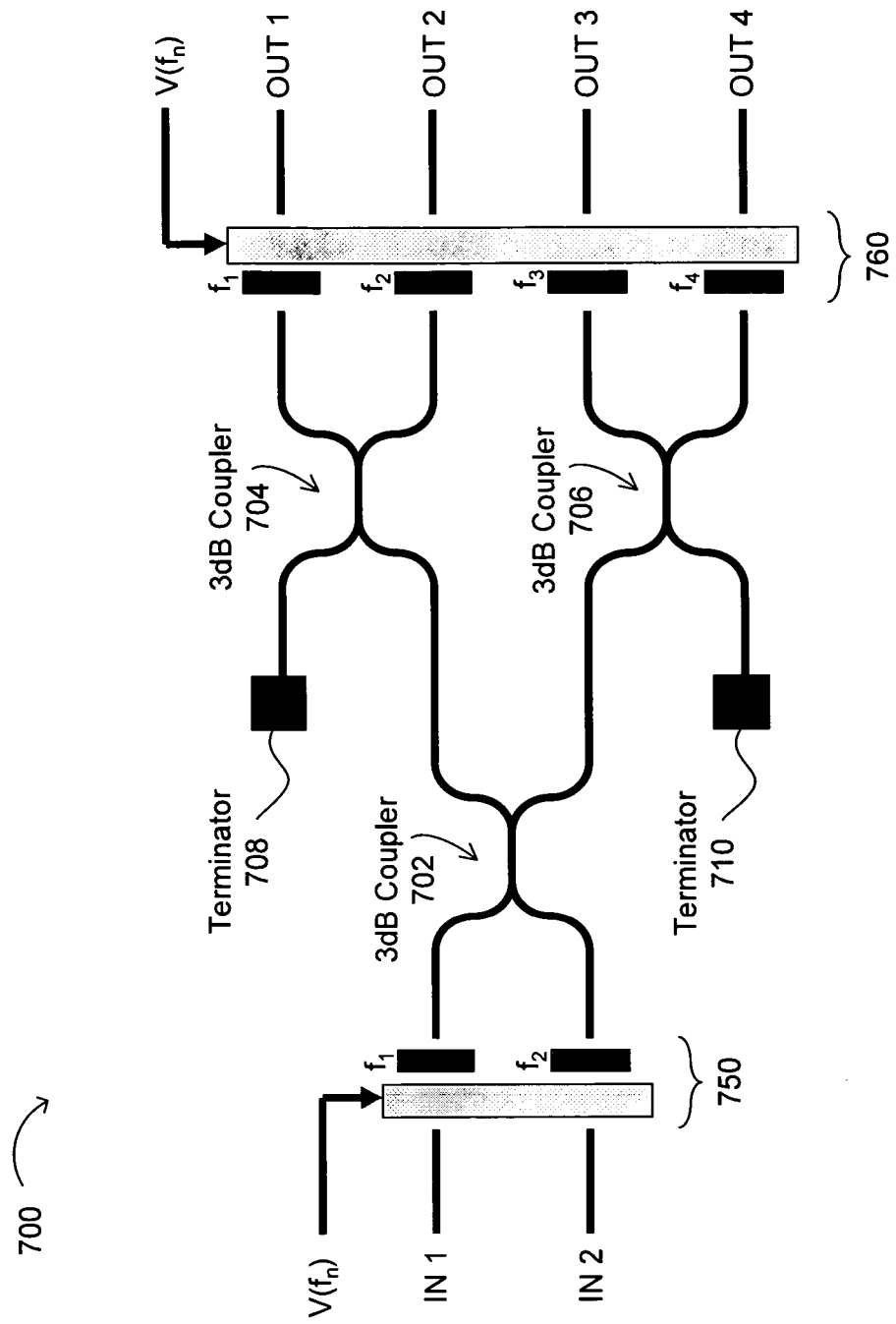
FIG. 7 is an exemplary 2×4 optical switch in accordance with embodiments of the present invention.

Referring now to FIG. 7, an exemplary 2×4 optical switch in accordance with embodiments of the present invention is shown and indicated by the general reference character 700. In this particular arrangement, IN 1 can be coupled to an $f_1$ resonating frequency shutter in shutter array 750, while IN 2 can be coupled to an $f_2$ resonating frequency shutter in shutter array 750, for example. Shutter array 750 can have $V(f_n)$ applied and its outputs can connect via 3 dB coupler 702, then to other 3 dB couplers 704 and 706. Terminators 708 and 710 can connect to 3 dB couplers 704 and 706, respectively, and may act to terminate optical signals. Terminators can be employed in order to prevent possible reflection of optical signals (e.g., from unused ends of optical fiber coupler connections) back into the system. Such reflections could cause erroneous optical operations (e.g., misread bits due to increased noise).

In shutter array 760, shutters corresponding to OUT 1, OUT 2, OUT 3, and OUT 4 can have resonating frequencies $f_1$, $f_2$, $f_3$, and $f_4$, respectively, as shown. Further, $V(f_n)$ can also be applied to shutter array 760. As will be shown below in FIG. 8, different frequencies applied via $V(f_n)$ (i.e., frequency-addressable shutters) can be used to make selections from inputs IN 1 and IN 2 to form paths to any of the outputs, OUT 1-4.

Figure 8:
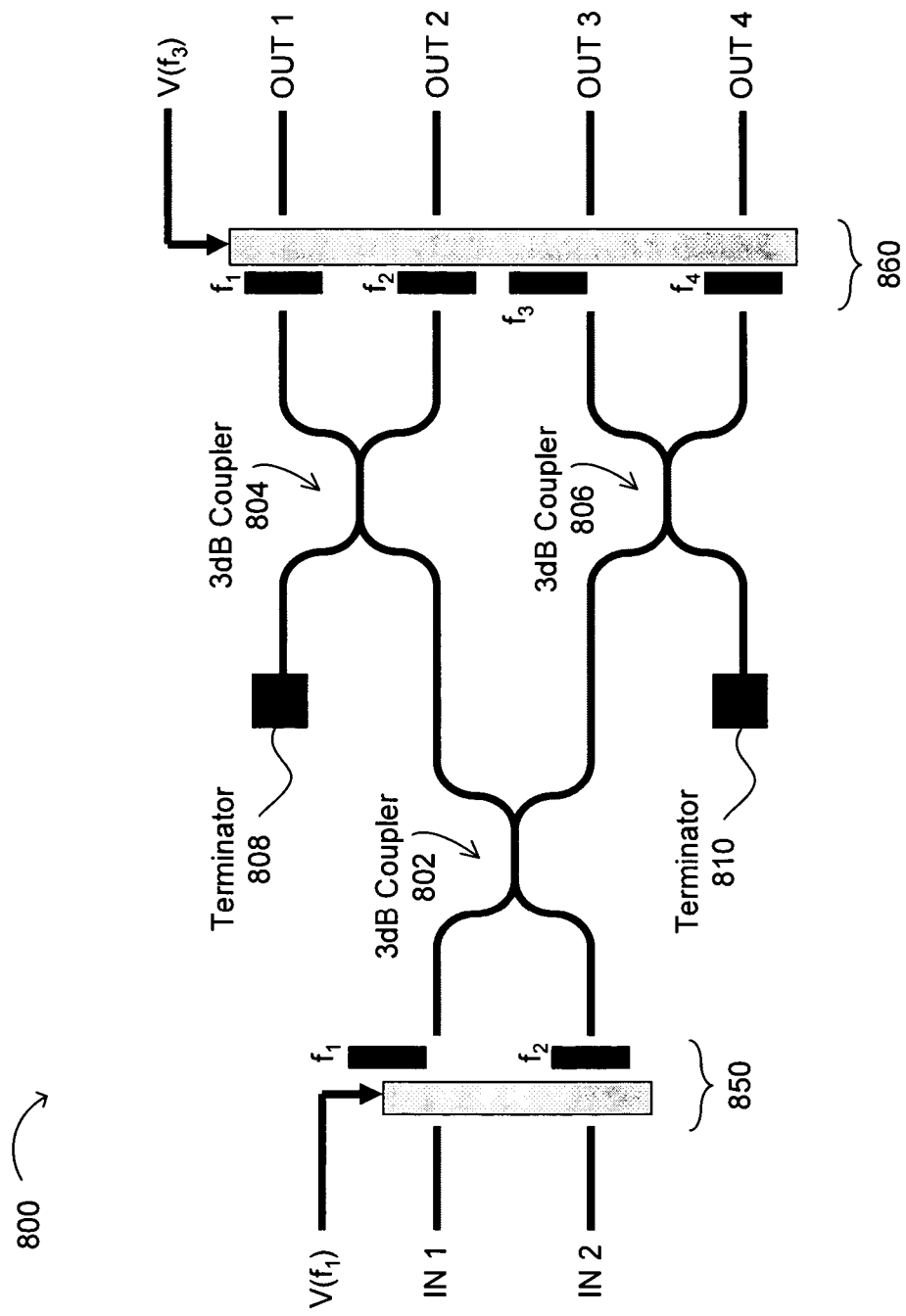
FIG. 8 shows exemplary 2×4 optical switch operation in accordance with embodiments of the present invention.

Referring now to FIG. 8, an exemplary 2×4 optical switch operation in accordance with embodiments of the present invention is shown and indicated by the general reference character 800. The general arrangement of FIG. 8 is similar to that of FIG. 7, but with 3 dB couplers 802, 804, and 806, and terminators 808 and 810, as shown. Further, $V(f_1)$ may be applied to shutter array 850, while $V(f_3)$ can be applied to shutter array 860. Thus, in this particular example, a frequency $f_1$ is applied to shutter array 850 and frequency $f_3$ is applied at shutter array 860.

Because IN 1 is coupled to an optical shutter having a resonant frequency of $f_1$, IN 1 is allowed to pass via 3 dB coupler 802. Further, because OUT 3 is coupled to an optical shutter having a resonant frequency of $f_3$, IN 1 is allowed to pass via 3 dB coupler 806 to OUT 3. In this fashion, an IN 1→OUT 3 optical path connection can be enabled using frequency-addressable shutters.

Referring now to FIG. 9, a conventional 4×4 optical switch realization using sixteen 2×2 switches is shown and indicated by the general reference character 900. Each 2×2 switch 902 can be connected as shown to realize a conventional 4×4 switching scheme from inputs (IN 1-4) to outputs (OUT 1-4). An addressing scheme can apply different (or some or all of the same) waveform signals to the various 2×2 switches 902 to obtain desired switch addressing and control performance. As shown in FIG. 9, such a conventional approach for an n-input to n-output switching system can be $2^n$. Thus, such a realization requires a relatively large number of components.

Figure 10:
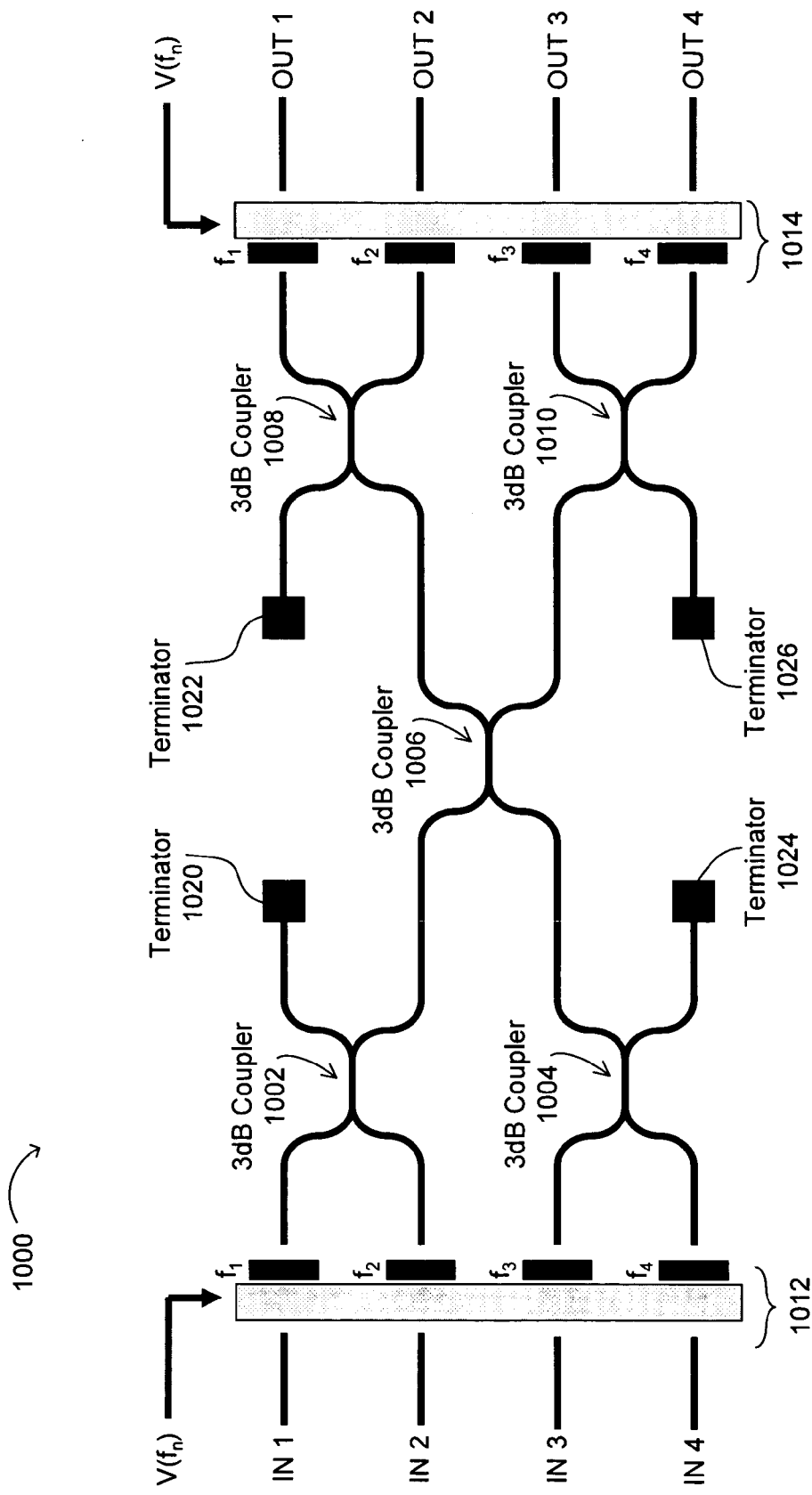
FIG. 10 is an exemplary 4×4 optical switch using addressable mechanical arrays in accordance with embodiments of the present invention.

Referring now to FIG. 10, an exemplary 4×4 optical switch using addressable mechanical arrays in accordance with embodiments of the present invention is shown and indicated by the general reference character 1000. Again, the same or different signal sources can be applied to the two arrays of switches (1012 and 1014), for example. With this approach in accordance with embodiments, larger arrays can be implemented much more efficiently than comparable conventional approaches.

In FIG. 10, IN 1, IN 2, IN 3, and IN 4 can be respectively coupled to shutters in shutter array 1012 having resonating frequencies $f_1$, $f_2$, $f_3$, and $f_4$, as shown. Shutter array 1012 can have $V(f_n)$ applied and its outputs can connect via 3 dB couplers 1002 and 1004, then to 3 dB coupler 1006, then to other 3 dB couplers 1008 and 1010, as shown. In shutter array 1014, shutters corresponding to OUT 1, OUT 2, OUT 3, and OUT 4 can have resonating frequencies $f_1$, $f_2$, $f_3$, and $f_4$, respectively, as shown. Further, $V(f_n)$ can also be applied to shutter array 1014. As will be shown below in FIG. 11, different frequencies applied via $V(f_n)$ (i.e., frequency-addressable shutters) can be used to make selections from inputs IN 1-4 to form paths to any of the outputs, OUT 1-4. Couplers 1002, 1004, 1008, and 1010 may also connect to terminators 1020, 1024, 1022, and 1026, respectively, in order to reduce possible back reflections.

Figure 11:
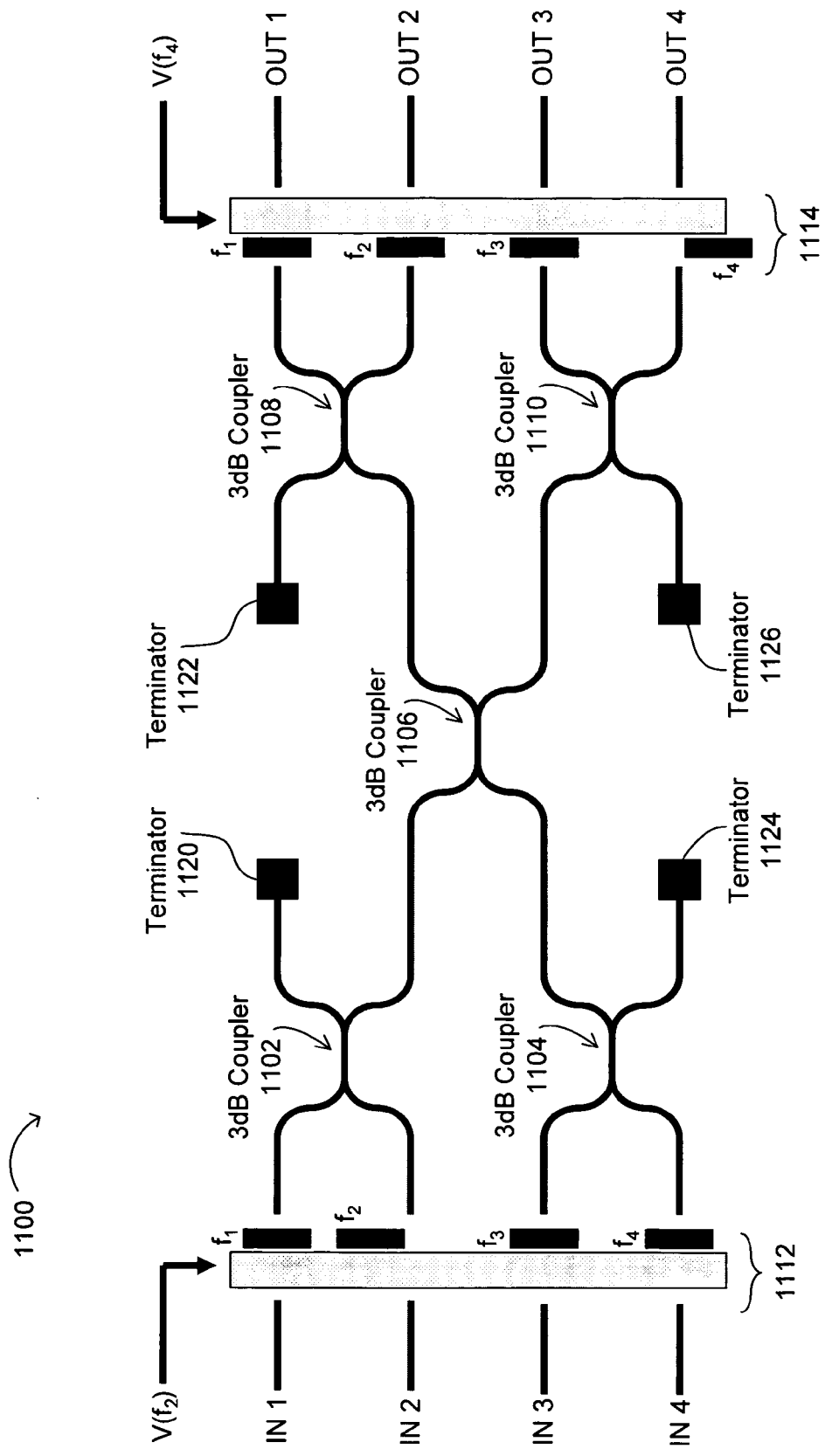
FIG. 11 is an exemplary 4×4 optical switch operation in accordance with embodiments of the present invention.

Referring now to FIG. 11, an exemplary 4×4 optical switch operation in accordance with embodiments of the present invention is shown and indicated by the general reference character 1100. The general arrangement of FIG. 11 is similar to that of FIG. 10, but with 3 dB couplers 1102, 1104, 1106, 1108, and 1110, as well as terminators 1120, 1122, 1124, and 1126, as shown. Further, $V(f_2)$ may be applied to shutter array 1112, while $V(f_4)$ can be applied to shutter array 1114. Thus, in this particular example, a frequency $f_2$ is applied to shutter array 1112 and frequency $f_4$ may be applied at shutter array 1114.

Because IN 2 is coupled to an optical shutter having a resonant frequency of $f_2$, IN 2 is allowed to pass via 3 dB couplers 1102 and 1106. Further, because OUT 4 is coupled to an optical shutter having a resonant frequency of $f_4$, IN 2 is allowed to pass via 3 dB coupler 1110 to OUT 4. In this fashion, an IN 2→OUT 4 optical path connection can be enabled using frequency-addressable shutters.

Figure 12:
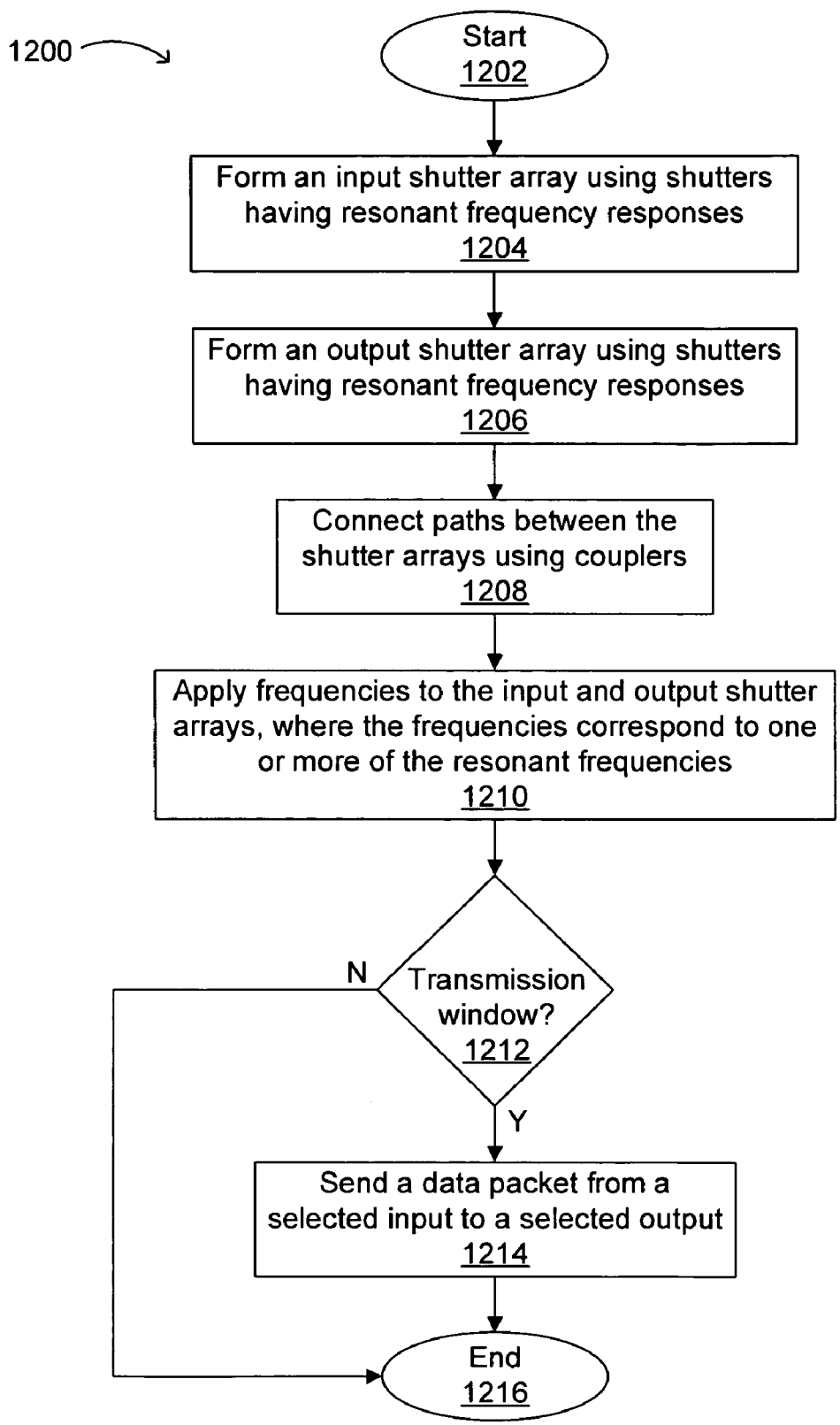
FIG. 12 is a simplified flow diagram of a method of implementing an optical switch in accordance with embodiments of the present invention.

Referring now to FIG. 12, a simplified flow diagram of a method of implementing an optical switch in accordance with embodiments of the present invention is shown and indicated by the general reference character 1200. The flow can begin (1202) and an input shutter array can be formed using shutters with resonant frequency responses (1204). An example of such an input shutter array is shutter array 1112, discussed above with reference to FIG. 11. Similarly, an output shutter array (e.g., 1114 of FIG. 11) can be formed using shutters with resonant frequency responses (1206). The resonant frequency responses can allow for frequency-addressable and/or controllable switches.

Paths between the shutter arrays can be connected using couplers (e.g., 3 dB couplers 1102, 1104, 1106, 1108, and 1110 of FIG. 11) (1208). Next, frequencies can be applied to the input and output shutter arrays, where the frequencies can correspond to one or more of the resonant frequencies (1210). In the example discussed above with reference to FIG. 11, $f_2$ (via $V(f_2)$) could be applied to shutter array 1112 to select IN 2 and $f_4$ (via $V(f_4)$) could be applied to shutter array 1114, to enable or allow an optical path connection from IN 2 to OUT 4.

When a given optical path connection (e.g., IN 2 to OUT 4) is enabled by such frequency addressing and/or control, a resulting transmission window (e.g., 606 of FIG. 6) can be established. If no transmission window is established (1212), the flow can complete (1216). However, if a transmission window is established (1212), a data packet (e.g., 608 of FIG. 6) can be sent from a selected input (e.g., IN 2) to a selected output (e.g., OUT 4) (1214) and the flow can complete (1216).

Although the invention has been described with reference to specific embodiments thereof, these embodiments are merely illustrative, and not restrictive of the invention. For example, although the use of 2×2, 2×4, and 4×4 optical switches are discussed, any suitable type of switch arrangement (e.g., n×n, m×n, etc.), larger arrays, as well as multiplexer and/or demultiplexer configurations can be used. Further, it should be apparent that the specific dimensions, physical measurements and/or other parameter values presented herein may be varied while still achieving desirable results.

Although an optical shutter is used in accordance with illustrative embodiments, in general, any type of MEMS structure can be subjected to resonant stimulation. For example, an array (or other collection) of mirrors, other types of switches, sensors, etc., can have one or more of its structures subjected to a frequency and a resulting vibration of the structure can be detected.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An optical switch, comprising:
   a shutter; and
   a flexure coupled to the shutter, whereupon a vibration transmitted to the flexure causes the shutter to move across an opening for passage of an optical signal through the opening, wherein the vibration occurs when in the presence of a frequency substantially equal to a resonant frequency of the optical switch.

2. The optical switch of claim 1, wherein multiple optical switches are arranged to allow multiple inputs to be directed to one or more outputs.

3. The optical switch of claim 1, wherein multiple optical switches are arranged to allow at least one input to be directed to one of multiple outputs.

4. The optical switch of claim 3, wherein the multiple optical switches are arranged to form a frequency-addressable 2×2 optical switch.

5. The optical switch of claim 3, wherein the multiple optical switches are arranged to form a frequency-addressable 2×4 optical switch.

6. The optical switch of claim 3, wherein the multiple optical switches are arranged to form a frequency-addressable 4×4 optical switch.

7. The optical switch of claim 1, further comprising an anchor coupled to the flexure, wherein the anchor is substantially fixed relative to the opening.

8. The optical switch of claim 1, wherein the resonant frequency is substantially determined by a geometry, a mass, and a stiffness of the flexure, and a mass of the shutter.

9. The optical switch of claim 1, further comprising optical fibers on either side of the opening, wherein the optical fibers are configured to pass an optical signal through the opening when the optical switch is in an open state.

10. The optical switch of claim 1, wherein the shutter and the flexure comprise silicon (Si), silicon germanium (SiGe), poly-crystalline silicon (poly-Si), or silicon carbide (SiC).

11. An optical switch, comprising:
    a shutter;
    a flexure coupled to the shutter, whereupon a vibration transmitted to the flexure causes the shutter to move across an opening for passage of an optical signal through the opening;
    optical fibers on either side of the opening, wherein the optical fibers are configured to pass an optical signal through the opening when the optical switch is in an open state, wherein the optical switch is in the open state when in the presence of a frequency substantially equal to a resonant frequency of the optical switch.

12. The optical switch of claim 11, wherein the open state is configured to provide a transmission window for sending a data packet.

13. A method of modulating light, the method comprising:
    forming input and output shutter arrays, each using shutters being responsive to resonant frequencies;
    connecting paths between the input and output shutter arrays using couplers;
    applying frequencies to the input and output shutter arrays, wherein the frequencies correspond to one or more of the resonant frequencies; and
    sending a packet from a selected input from the input shutter array to a selected output in the output shutter array.

14. The method of claim 13, wherein the sending the packet comprises using optical fibers positioned adjacent to the selected input and the selected output.

15. The method of claim 13, wherein the connecting paths comprises attaching a terminator to at least one of the couplers.

16. The method of claim 13, wherein the couplers include 3dB couplers.

17. The method of claim 13, wherein the applying frequencies comprises using a voltage signal related to the one or more of the resonant frequencies.

* * * * *